(12) United States Patent
Park et al.

(10) Patent No.: US 10,608,219 B2
(45) Date of Patent: Mar. 31, 2020

(54) INTEGRATED CARTRIDGE AND BATTERY PACK COMPRISING SAME

(71) Applicant: LG Chem, Ltd., Seoul (KR)

(72) Inventors: Won-Kyoung Park, Daejeon (KR); Seong-Tae Kim, Daejeon (KR); Jun-Kyu Park, Daejeon (KR); Jun-Yeob Seong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 40 days.

(21) Appl. No.: 15/744,044

(22) PCT Filed: Feb. 7, 2017

(86) PCT No.: PCT/KR2017/001347
§ 371 (c)(1),
(2) Date: Jan. 11, 2018

(87) PCT Pub. No.: WO2017/138733
PCT Pub. Date: Aug. 17, 2017

(65) Prior Publication Data
US 2018/0212215 A1    Jul. 26, 2018

(30) Foreign Application Priority Data

Feb. 12, 2016  (KR) .................. 10-2016-0016390
Sep. 13, 2016  (KR) .................. 10-2016-0118088

(51) Int. Cl.
*H01M 2/10* (2006.01)
*H01M 2/20* (2006.01)
(Continued)

(52) U.S. Cl.
CPC ......... *H01M 2/1077* (2013.01); *H01M 2/206* (2013.01); *H01M 10/4257* (2013.01);
(Continued)

(58) Field of Classification Search
None
See application file for complete search history.

(56) References Cited

U.S. PATENT DOCUMENTS 8,609,276 B2   12/2013  Han et al.
9,005,794 B2    4/2015  Zhao
(Continued)

FOREIGN PATENT DOCUMENTS

JP      2013-143395 A     7/2013
JP      2013-145726 A     7/2013
(Continued)

OTHER PUBLICATIONS

Kim et al. (KR 10-2015-0055255) (a raw machine translation) (Abstract) (Year: 2015).*
(Continued)

*Primary Examiner* — Carmen V Lyles-Irving
(74) *Attorney, Agent, or Firm* — Morgan, Lewis & Bockius LLP

(57) ABSTRACT

An integrated cartridge, comprising: a main frame composed of a front plate having a plurality of lead passing holes provided in a slit form so that electrode leads of a plurality of layered battery cells pass therethrough, and first and second side plates extending at both edges of the front plate in parallel to each other and having a plurality of cell insert slots provided at inner sides thereof, which face each other, so that the plurality of battery cells are capable of being inserted from a free end to the front plate; a cover plate coupled to the first and second side plates to cover the plurality of battery cells arranged in a layered form between the first and second side plates; and a sensing unit mounted to the front plate and electrically connected to the electrode leads to sense electric characteristics of the plurality of battery cells.

12 Claims, 12 Drawing Sheets

(51) Int. Cl.
*H01M 10/42* (2006.01)
*H01M 10/48* (2006.01)

(52) U.S. Cl.
CPC .. *H01M 10/482* (2013.01); *H01M 2010/4271* (2013.01); *H01M 2220/20* (2013.01)

(56) References Cited

U.S. PATENT DOCUMENTS

| | | | |
|---|---|---|---|
| 9,024,587 B2 | 5/2015 | Jeon et al. | |
| 9,484,592 B2 | 11/2016 | Roh et al. | |
| 2013/0216878 A1 | 8/2013 | Merriman et al. | |
| 2014/0320070 A1 | 10/2014 | Nakamoto et al. | |
| 2015/0072209 A1 | 3/2015 | Tyler et al. | |
| 2015/0145482 A1* | 5/2015 | Hurng .................. | H01M 2/1022 320/134 |
| 2017/0077562 A1 | 3/2017 | Park et al. | |

FOREIGN PATENT DOCUMENTS

| | | |
|---|---|---|
| JP | 2014-217169 A | 11/2014 |
| JP | 2015-511384 A | 4/2015 |
| KR | 10-2013-0023059 A | 3/2013 |
| KR | 10-2013-0044984 A | 5/2013 |
| KR | 10-2014-0062171 A | 5/2014 |
| KR | 10-1392799 B1 | 5/2014 |
| KR | 10-2015-0055255 A | 5/2015 |
| WO | 2015/133760 A1 | 9/2015 |

OTHER PUBLICATIONS

Kim et al. (KR 10-2015-0055255) (a raw machine translation) (Detailed Description) (Year: 2015).*
Kim et al. (KR 10-2015-0055255) (a raw machine translation) (Drawings) (Year: 2015).*
Jeon et al. (KR 10-2015-0055255) (a raw machine translation) (Abstract) (Year: 2013).*
Jeon et al. (KR 10-2015-0055255) (a raw machine translation) (Detailed Description) (Year: 2013).*
Jeon et al. (KR 10-2015-0055255) (a raw machine translation) (Drawings) (Year: 2013).*
Amended Fig. 3 from Kim et al. (KR 10-2015-0055255) (Year: 2015).*
International Search Report and Written Opinion for Application No. PCT/KR2017/001347, dated May 12, 2017 (14 pages).

* cited by examiner

INTEGRATED CARTRIDGE AND BATTERY PACK COMPRISING SAME

The present application claims priority under 35 U.S.C. § 119 to Korean Patent Application Nos. 10-2016-0016390, filed on Feb. 12, 2016 and 10-2016-0118088, filed on Sep. 13, 2016 in the Republic of Korea, and under 35 U.S.C. § 365 to PCT/KR2017/001347, filed on Feb. 7, 2017, the disclosures of which are incorporated herein by reference.

TECHNICAL FIELD

The present disclosure relates to a battery pack, and more particularly, to a battery pack in which functions and structures of some components are integrated.

The present application claims priority to Korean Patent Application No. 10-2016-0016390 filed on Feb. 12, 2016 and Korean Patent Application No. 10-2016-0118088 filed on Sep. 13, 2016 in the Republic of Korea, the disclosures of which are incorporated herein by reference.

BACKGROUND ART

In recent years, secondary batteries have been widely used not only for small-sized devices such as portable electronic devices but also for electric vehicles that require a driving force by using an internal combustion engine and/or an electric motor. The electric vehicle includes a hybrid vehicle, a plug-in hybrid vehicle, and a pure electric vehicle driven only by an electric motor and a battery without an internal combustion engine.

In an electric vehicle, a large number of secondary batteries are electrically connected to increase capacity and output. Particularly, pouch-type secondary batteries are commonly used in such medium or large devices since they are easily stackable on one another.

Since the pouch-type secondary battery is generally packaged by a battery case made of an aluminum and polymer resin laminate sheet and thus does not have great mechanical stiffness, when a battery module is constructed including a plurality of pouch-type secondary batteries, in many cases, cartridges are used in order to protect the secondary battery from external shock or the like, to prevent movement thereof and to facilitate easy stacking.

A plurality of cartridges accommodating the pouch-type secondary batteries are stacked on one another, and the battery module may be composed of the plurality of secondary batteries and cartridges stacked one another.

Meanwhile, a conventional cartridge is composed of a lower frame and an upper frame. For example, two secondary battery cells are stacked on an upper surface of the lower frame, then the upper frame is laid thereon, and then the upper and lower frames are coupled. Unit cartridges configured as above may be stacked up and down to form a cell cartridge assembly. If the cell cartridge assembly is prepared, a battery pack may be completed by assembling a sensing assembly connected to the plurality of secondary batteries to sense voltage characteristics of the secondary batteries and other electrical components such as BMS thereto.

However, in the conventional technique, any one unit cartridge should be assembled with another cartridge, and the assembled cartridges should be restrained using a fixing member to make a single body, which is a cumbersome manufacturing process. In addition, the cell cartridge assembly prepared as above should be assembled with other electrical components such as a sensing assembly, which requires housings and members for assembling them.

When manufacturing a battery pack as described above, if the number of assembling/coupling portions is increased, the manufacturing process becomes complicated, and the tolerance ratio may increase accordingly. In addition, the space occupied by other components in the battery pack is high in comparison to the space occupied by the secondary battery cells, which decreases the energy intensity and increases the manufacturing cost due to the increased number of components.

DISCLOSURE

Technical Problem

The present disclosure is designed to solve the problems of the related art, and therefore the present disclosure is directed to providing a battery pack, which may simplify a manufacturing process and reduce the number of components by integrating functions and structures of some components of the battery pack.

However, the technical objects aimed by the present disclosure are not limited to the above, and other objects not mentioned herein will be apparently understood from the following description by those skilled in the art.

Technical Solution

In one aspect of the present disclosure, there is provided an integrated cartridge, comprising: a main frame composed of a front plate having a plurality of lead passing holes provided in a slit form so that electrode leads of a plurality of battery cells arranged in a layered form pass therethrough, and first and second side plates extending at both edges of the front plate in parallel to each other and having a plurality of cell insert slots provided at inner sides thereof, which face each other, so that the plurality of battery cells are capable of being inserted from a free end to the front plate; a cover plate coupled to the first and second side plates to cover the plurality of battery cells arranged in a layered form between the first and second side plates; and a sensing unit mounted to the front plate and electrically connected to the electrode leads to sense electric characteristics of the plurality of battery cells.

The first side plate, the second side plate and the front plate may be formed integrally.

The sensing unit may include: a plurality of lead connecting bus bars configured to contact the electrode leads drawn to the outside through the plurality of lead passing holes, respectively; a printed circuit board (PCB) electrically connected to one ends of the plurality of lead connecting bus bars; and a terminal connecting bus bar extending from the PCB to the outside.

The plurality of lead connecting bus bars may be coupled to the front plate by means of snap-fitting or hooking.

The front plate may further include a board placing unit shaped to conform to the PCB.

The terminal connecting bus bar may include a positive electrode terminal connecting bus bar and a negative electrode terminal connecting bus bar, the positive electrode terminal connecting bus bar may have one end connected to the PCB and the other end disposed to be closely adhered to an outer surface of the first side plate, and the negative electrode terminal connecting bus bar may have one end connected to the PCB and the other end disposed to be closely adhered to an outer surface of the second side plate.

The integrated cartridge may further comprise: a first terminal connecting member respectively coupled to the other ends of the positive electrode terminal connecting bus bar and the negative electrode terminal connecting bus bar; and a second terminal connecting member respectively coupled to the first and second side plates with a predetermined interval from the first terminal connecting member.

The cover plate may include an upper plate and a lower plate respectively coupled to a top end and a bottom end of the first and second side plates, and a rear plate connecting one edges of the upper plate and the lower plate, and the cover plate may configure a box form together with the first side plate, the second side plate and the front plate.

The first and second side plates may further include fitting portions respectively provided at the top end and the bottom end so that both sides of the upper plate and the lower plate are fit therein.

The fitting portion may have a hole formed therein in a vertical direction, and the upper and lower plates may have bolt coupling holes communicating with the hole in a state where the first and second side plates are fit into the fitting portion, and a coupling member may be inserted into the hole and the bolt coupling hole so that the cover plate is restrained by the main frame.

In another aspect of the present disclosure, there is also provided a battery pack, comprising: an integrated cartridge as described above; a plurality of battery cells accommodated in the cartridge; a relay assembly attached to an outer surface of the first side plate of the integrated cartridge; and a battery management system (BMS) assembly attached to an outer surface of the second side plate of the integrated cartridge.

The battery pack may further comprise: a battery pack housing and a battery pack cover coupled to each other to accommodate the plurality of battery cells, the relay assembly and the BMS assembly; and at least one terminal electrically connected to the plurality of battery cells and provided to pass through the battery pack cover to the outside and be connected to an external power source, the at least one terminal being insert-injected to the battery pack cover.

The at least one terminal may be additionally coupled to the battery pack cover by bonding.

In another aspect of the present disclosure, there is also provided a vehicle, comprising the battery pack described above.

Advantageous Effects

According to an embodiment of the present disclosure, it is possible to provide an integrated cartridge which may serve to assemble cells and sense a voltage.

According to another embodiment of the present disclosure, the number of major components of the battery pack may be reduced, compared with the existing technique. Thus, the manufacturing cost may be reduced, and the assembling/coupling portions among components may be reduced, thereby simplifying the battery pack manufacturing process. In addition, the volume of other components required for the same number of battery cells may be reduced compared to the existing technique, which may increase the energy intensity of the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
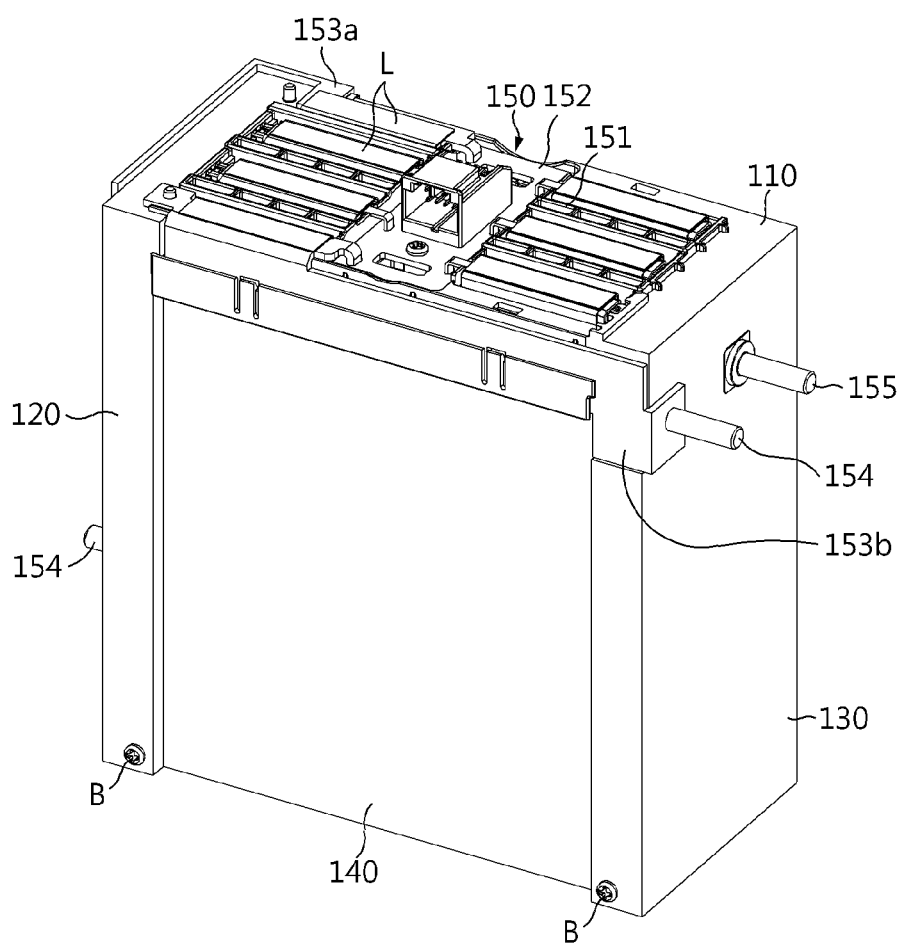
FIG. 1 is a schematic perspective view showing an integrated cartridge according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Since the embodiments disclosed herein are provided for more perfect explanation of the present disclosure, the shape, size and the like of components may be exaggerated, omitted or simplified in the drawings for better understanding. Thus, the size and ratio of components in the drawings do not wholly reflect the actual size and ratio.

Figure 2:
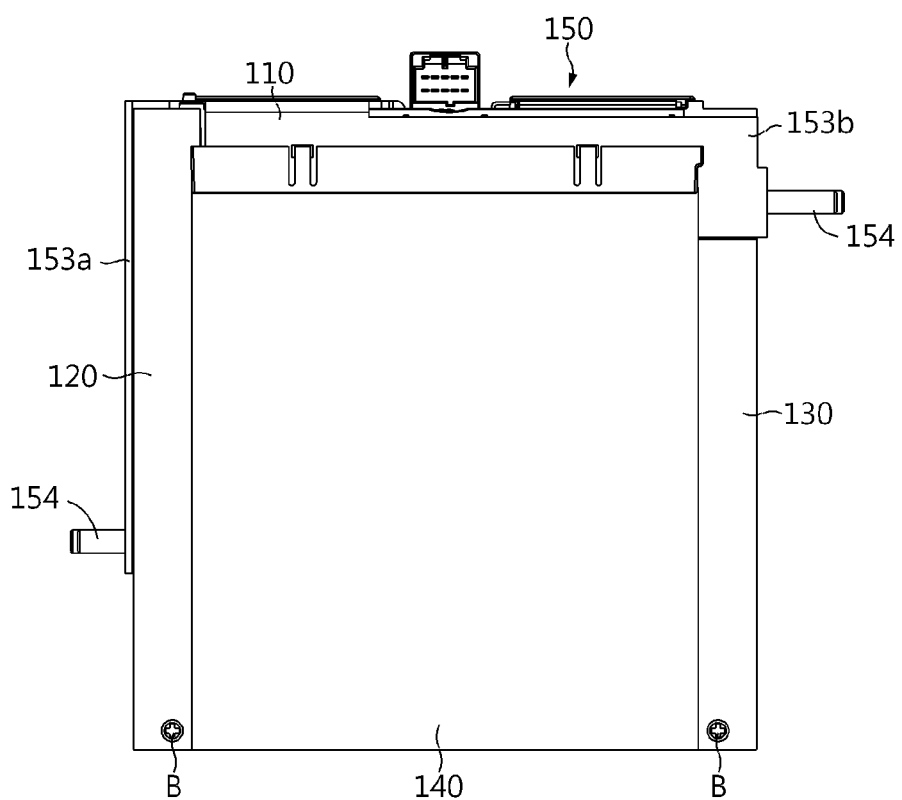
FIG. 2 is a front view of FIG. 1.

FIG. 1 is a schematic perspective view showing an integrated cartridge according to an embodiment of the present disclosure, and FIG. 2 is a front view of FIG. 1.

Referring to FIGS. 1 and 2, an integrated cartridge 100 according to this embodiment includes main frames 110, 120, 130 having a substantially "[" shape, a cover plate 140 complementarily coupled to the main frames 110, 120, 130, and a sensing unit 150 mounted to a front surface of the main frames 110, 120, 130. In the integrated cartridge 100, the main frames 110, 120, 130 and the cover plate 140 may be complementarily coupled to form an empty space therein, and a plurality of battery cells may be stacked in the inner space.

The main frames 110, 120, 130 according to the present disclosure guide the battery cells to be assembled so that the battery cells are arranged in a layered form, and hold the battery cells to prevent movement thereof. In addition, the main frames 110, 120, 130 are configured to facilitate each mounting of the sensing unit 150 for sensing electrical characteristics of the battery cells.

In detail, the main frames 110, 120, 130 may include a front plate 110 and first and second side plates 120, 130 extending in parallel to each other at both edges of the front plate 110. The front plate 110 and the first and second side plates 120, 130 are conceptually distinguished elements, and these three plates may also be integrally formed.

Figure 3:
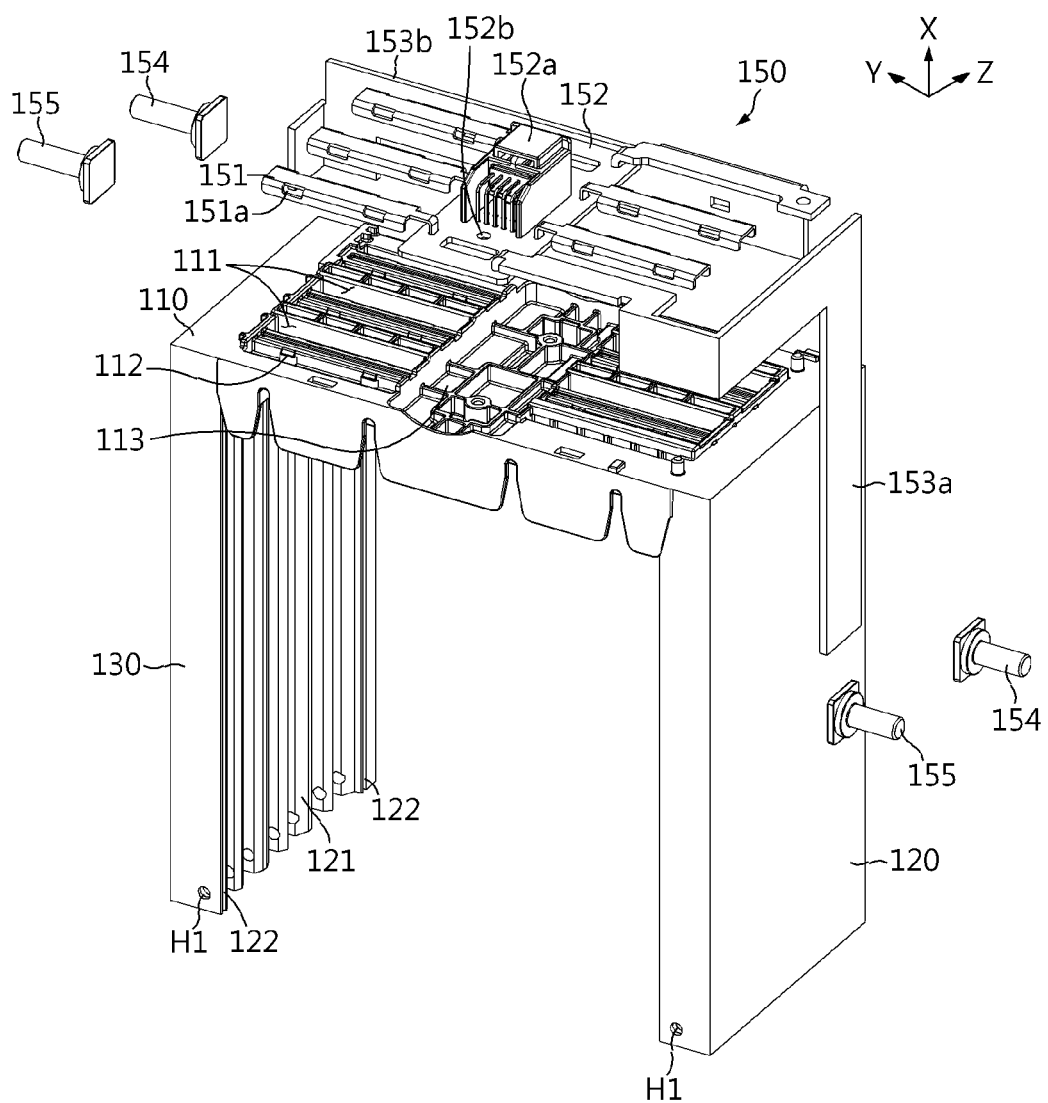
FIG. 3 is an exploded perspective view showing a main frame and a sensing unit according to an embodiment of the present disclosure.
Figure 4:
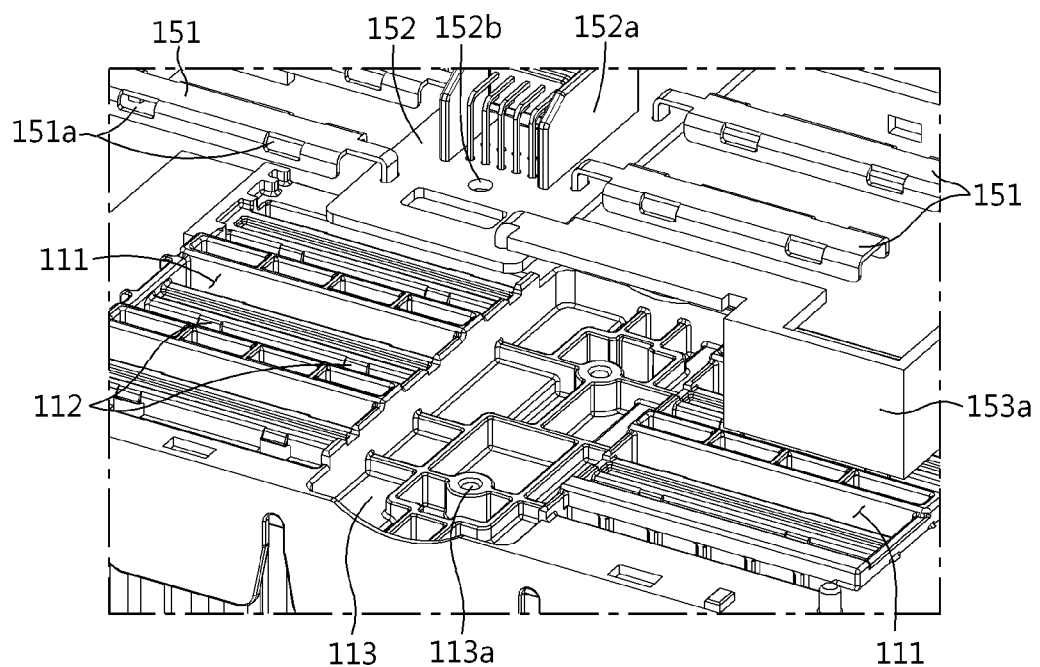
FIG. 4 is an enlarged view showing an essential portion of FIG. 3.
Figure 5:
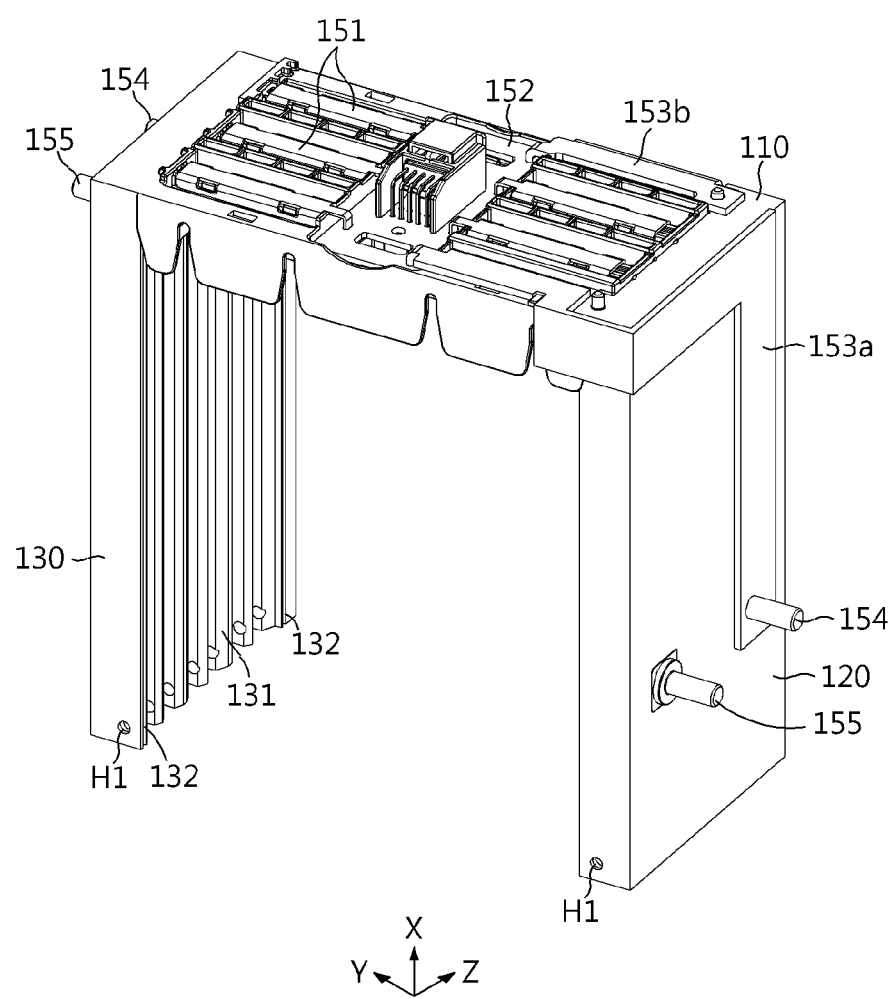
FIG. 5 is a perspective view showing the main frame and the sensing unit of FIG. 3, which are coupled.
Figure 6:
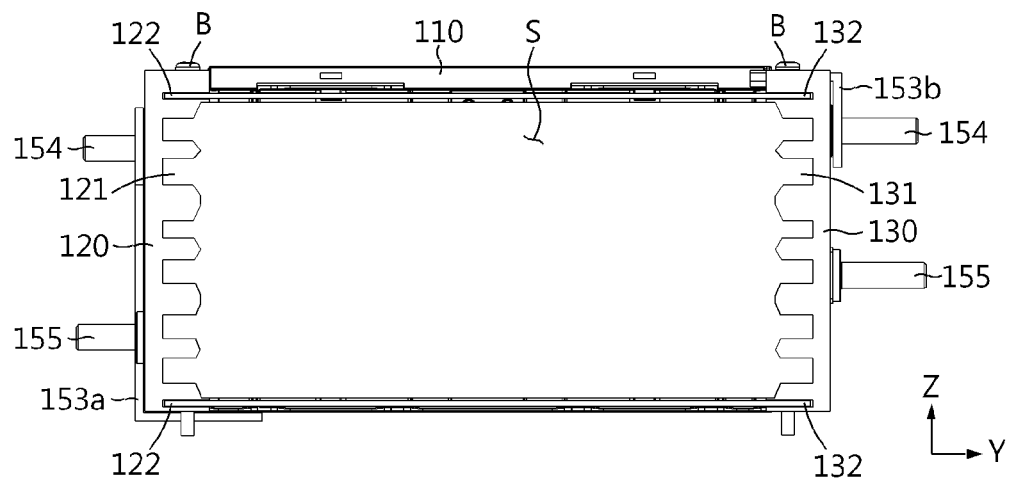
FIG. 6 shows the main frame of FIG. 5, observed from the below.

FIG. 3 is an exploded perspective view showing a main frame and a sensing unit according to an embodiment of the present disclosure, FIG. 4 is an enlarged view showing an essential portion of FIG. 3, FIG. 5 is a perspective view showing the main frame and the sensing unit of FIG. 3, which are coupled, and FIG. 6 shows the main frame of FIG. 5, observed from the below.

First, referring to FIGS. 3 and 4, the front plate 110 may have a plurality of lead passing holes 111 cut into a slit shape. The plurality of lead passing holes 111 may be provided in multiple stages at both side regions of the front plate 110 based on its center.

In this configuration, electrode leads L of the battery cells, namely a positive electrode lead and a negative electrode lead, may extend outward from the inside of the front plate 110 through the lead passing holes 111. In addition, end portions of the electrode leads L of the battery cells stacked vertically adjacent to each other may be bent out of the front plate 110 to be in contact with each other.

For example, an end portion of any one electrode lead L may be bent downward at an angle of 90 degrees (see FIG. 1) and an end portion of another electrode lead L may be bent upward at an angle of 90 degrees so that the end portions thereof are superposed to face each other, and then, for example, the superposed end portions of the electrode leads L are welded to a lead connecting bus bar 151, explained later, using a laser welding machine so that the end portions are electrically connected.

In addition, the front plate 110 may further include hooks 112 for fixing the lead connecting bus bar 151. For example, as shown in FIGS. 3 and 4 of this embodiment, the hooks 112 may be provided around the lead passing holes 111 to which the lead connecting bus bar 151 is mounted. The hooks 112 may be formed in advance by injection molding and selectively coupled to the hook coupling grooves 151*a* of the lead connecting bus bar 151. In addition, a board placing unit 113 to which a PCB 152, explained later, is mounted may be formed at the center of the front plate 110. The board placing unit 113 may be shaped to conform to a broad plate surface of the PCB 152, and a screw coupling hole 113*a* may be formed at an inside thereof. In addition, the PCB 152 may have a hole 152*b* at a position corresponding to the screw coupling hole 113*a* of the board placing unit 113 so that a screw may pass therethrough. Different from this embodiment, the PCB 152 may also be mounted to the board placing unit by means of snap-fitting.

The first and second side plates 120, 130 may extend in parallel to each other at both edges of the front plate 110. The first and second side plates 120, 130 have a plurality of cell insert slots 121, 131 formed on inner surfaces thereof which face each other. For example, as shown in FIGS. 5 and 6, the cell insert slots 121, 131 may be formed in the inner surfaces of the first and second side plates 120, 130 from a top end thereof to a bottom end thereof (in a Z-axial direction in FIGS. 5 and 6) at predetermined intervals.

The battery cells may be inserted into the cell insert slots 121, 131 one by one so that the electrode lead portions are oriented toward the front plate 110. In other words, the battery cells may be inserted from free ends of the first and second side plates 120, 130 to positions adjacent to the front plate 110, and at this time, the electrode lead portions of the battery cells may be drawn out of the lead passing holes 111 of the front plate 110. As the battery cells are inserted into the corresponding cell insert slots 121, 131 one by one as described above, the battery cells may be stacked in the inner space S of the main frames 110, 120, 130.

In addition, the first and second side plates 120, 130 may further include fitting portions 122, 132 at the top end and the bottom end of the inner surfaces thereof, respectively. Also, a hole H1 maybe further provided through the fitting portions 122, 132 in a vertical direction to communicate from the top end to the bottom end (in a Z-axial direction of FIGS. 5 and 6) of the first and second side plates 120, 130. An elongated bolt B may pass through the hole H1. In this embodiment, one hole H1 is provided at every two free ends of the first and second side plates 120, 130, but the position and number of the hole H1 may be further added.

In this embodiment, the fitting portions 122, 132 may be provided at four positions, namely at the top and bottom portions of the cell insert slots 121, 131 of the first and second side plates 120, 130, respectively. The fitting portions 122, 132 are formed in a longitudinal direction (in an X-axial direction of FIG. 5), namely from the free ends of the first and second side plates 120, 130 to positions adjacent to the front plate 110, and the fitting portions 122, 132 may have a width corresponding to the thickness of the cover plate 140.

Figure 7:
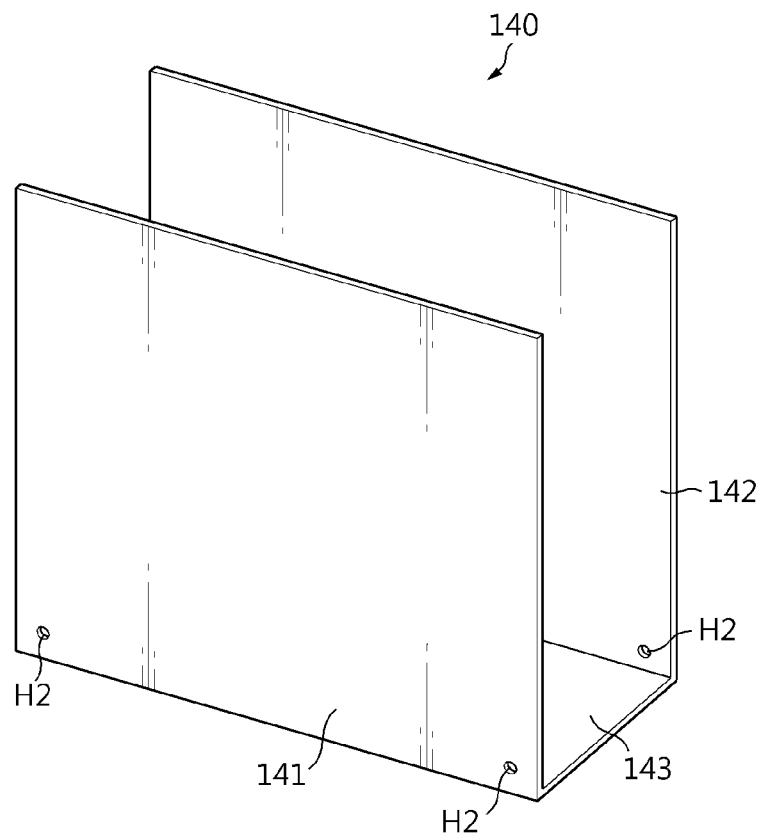
FIG. 7 is a schematic perspective view showing a cover plate according to an embodiment of the present disclosure.
Figure 8:
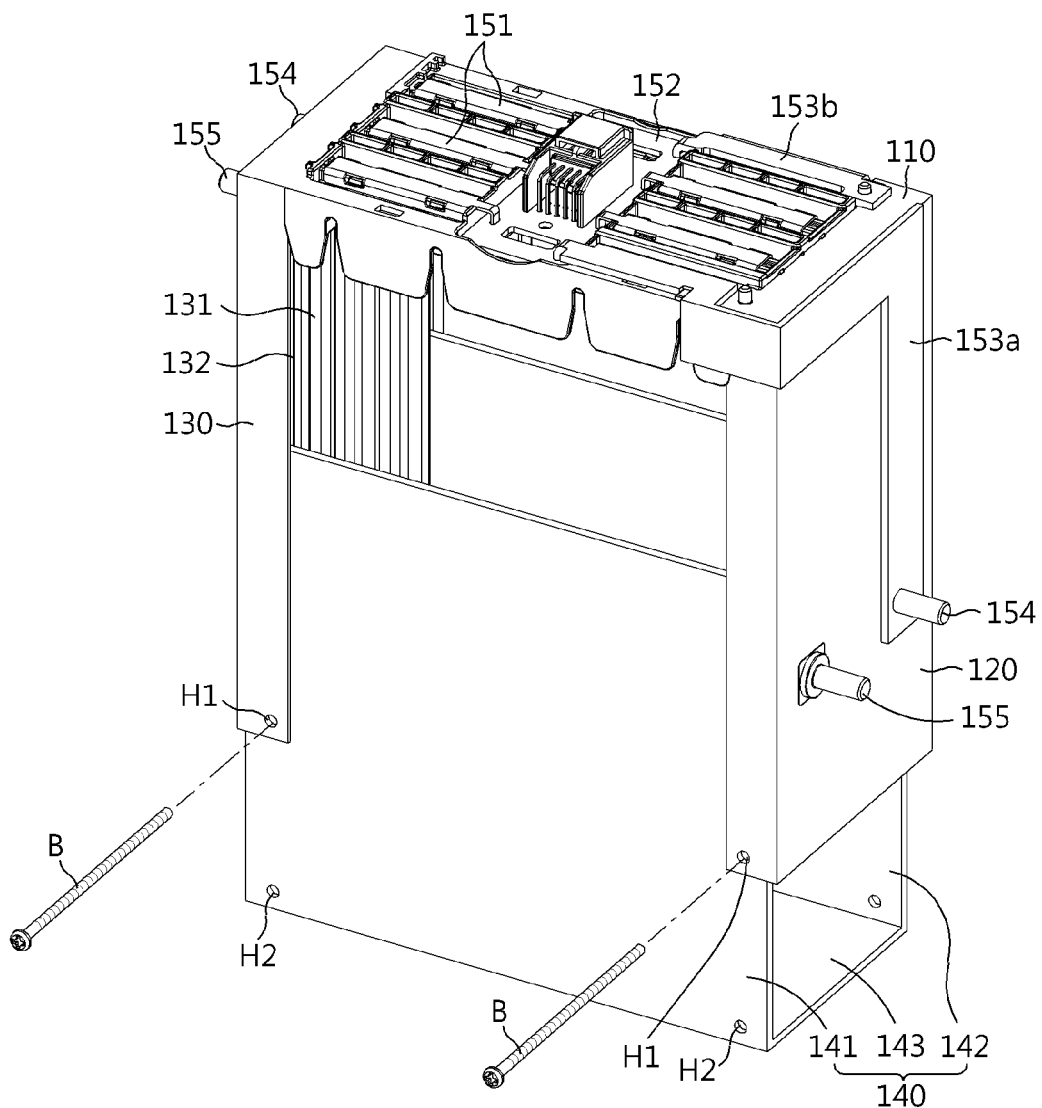
FIG. 8 is a perspective view partially showing the main frame and the cover plate according to an embodiment of the present disclosure.

FIG. 7 is a schematic perspective view showing a cover plate according to an embodiment of the present disclosure, and FIG. 8 is a perspective view partially showing the main frame and the cover plate according to an embodiment of the present disclosure. The cover plate 140 is coupled to the main frames 110, 120, 130 to form an outer shape of the integrated cartridge. In more detail, as shown in FIGS. 7 and 8, the cover plate 140 of this embodiment is a plate-shaped structure with a "[" shape complementary to the main frames 110, 120, 130 and may include an upper plate 141, a lower plate 142 and a rear plate 143.

The upper plate 141 and the lower plate 142 are spaced apart from each other by a predetermined distance, and the rear plate 143 connects one edges of the upper and lower plates 141, 142. Accordingly, the cover plate 140 may be formed with a substantially "[" shape that is complementary to the main frames 110, 120, 130. The cover plate 140 may be coupled to the main frames 110, 120, 130 to configure a box form. For reference, these three plates are conceptually distinguished elements, and these three plates may also be formed integrally.

Referring to FIG. 8, both side portions of the upper plate 141 may be fitted into the fitting portions 122, 132 provided at the top ends of the first and second side plates 120, 130, and simultaneously, both side portions of the lower plate 142 may be fitted into the fitting portions 122, 132 provided at the bottom ends of the first and second side plates 120, 130.

The upper plate 141 may be disposed at an upper portion of a battery cell, which is located at an uppermost location, to support the battery cell stack from the above. In addition, the lower plate 142 may be disposed at a lower portion of a battery cell, which is located at a lowermost location, to support the battery cell stack from the below. For reference, the upper and lower plates 141, 142 are provided with a substantially similar shape, and a convex pattern may be further formed at a surface thereof.

In addition, the upper and lower plates 141, 142 may further include a bolt coupling hole H2 at a position corresponding to the hole H1 of the first and second side plates 120, 130 described above. When the upper and lower plates 141, 142 are completely pushed into the fitting portions 122, 132 of the first and second side plates 120, 130, the hole H1 and the bolt coupling hole H2 may be communicated up and down. In addition, the cover plate 140 and the main frames 110, 120, 130 may be coupled integrally by, for example, inserting a coupling member such as an elongated bolt B into the hole H1 and the bolt coupling hole H2 and fastening the coupling member by a nut at an opposite side.

The cover plate 140 may provide mechanical support for the battery cells and protect the battery cells from external shocks or the like. Thus, the cover plate 140 may be made of a metal such as steel to ensure rigidity. However, even though the cover plate 140 is formed integrally in this embodiment, in an alternative embodiment, the upper plate 141, the lower plate 142 and the rear plate 143 may be formed independently and coupled to the main frames 110, 120, 130, respectively.

Referring to FIGS. 3 to 6 again, the sensing unit 150 includes a plurality of lead connecting bus bars 151, a PCB 152, terminal connecting bus bars 153a, 153b, and first and second terminal connecting members 154, 155.

The plurality of lead connecting bus bars 151 are made of an electrically conductive material such as copper or aluminum and are electrically connected to the positive electrode leads or the negative electrode leads of the battery cells by means of direct contact to sense electrical characteristics of the battery cells.

In this embodiment, the plurality of lead connecting bus bars 151 are configured to be detachably attached to the front plate 110, respectively. For example, the plurality of lead connecting bus bars 151 may be provided in a substantially arc-shaped form and mounted to a structure around the lead passing hole 111 of the front plate 110 by means of snap-fitting, and simultaneously, the hook coupling groove 151a formed in the body may be hooked to the hook 112 of the front plate 110. The electrode lead may be welded to the body of the lead connecting bus bar 151. In addition, one end of each lead connecting bus bar 151 may be electrically connected to the PCB 152.

The PCB 152 has an internal circuit in which the plurality of lead connecting bus bars 151 may be independently connected to a connector terminal, and may be implemented, for example, in the form of a printed circuit board on which a pattern of the internal circuit is printed. A connector terminal 152a corresponds to a terminal to which an external device for measuring a voltage of each battery cell is connected. The PCB 152 may be coupled to the screw coupling hole 113a of the board placing unit 113 by means of screwing so as to be stably fixed to the front plate 110.

The terminal connecting bus bars 153a, 153b include a positive electrode terminal connecting bus bar 153a and a negative electrode terminal connecting bus bar 153b. A current may flow out of the battery module through the positive electrode terminal connecting bus bar 153a and into the battery module through the negative electrode terminal connecting bus bar 153b.

The positive electrode terminal connecting bus bar 153a is disposed so that its one end is connected to the PCB 152 and the other end is closely adhered to the outer surface of the first side plate 120. Similarly, the negative electrode terminal connecting bus bar 153b is disposed so that its one end is connected to the PCB 152 and the other end is closely adhered to the outer surface of the second side plate 130. In addition, the first terminal connecting member 154 may be coupled to the other ends of the positive electrode terminal connecting bus bar 153a and the negative electrode terminal connecting bus bar 153b, respectively. Also, the second terminal connecting member 155 may be coupled to the first and second side plates 120, 130 with a predetermined interval from the first terminal connecting member 154. The first and second terminal connecting members 154, 155 may have a bolt form made of electrically conductive material.

As the other end portions of the positive electrode terminal connecting bus bar 153a and the negative electrode terminal connecting bus bar 153b are closely adhered to the first side plate 120 and the second side plate 130, respectively, and the first and second terminal connecting members 154, 155 are coupled to the first and second side plates 120, 130 as described above, it is possible that the integrated cartridge 100, the relay assembly 200 and the BMS assembly 300 are easily assembled and coupled.

Figure 9:
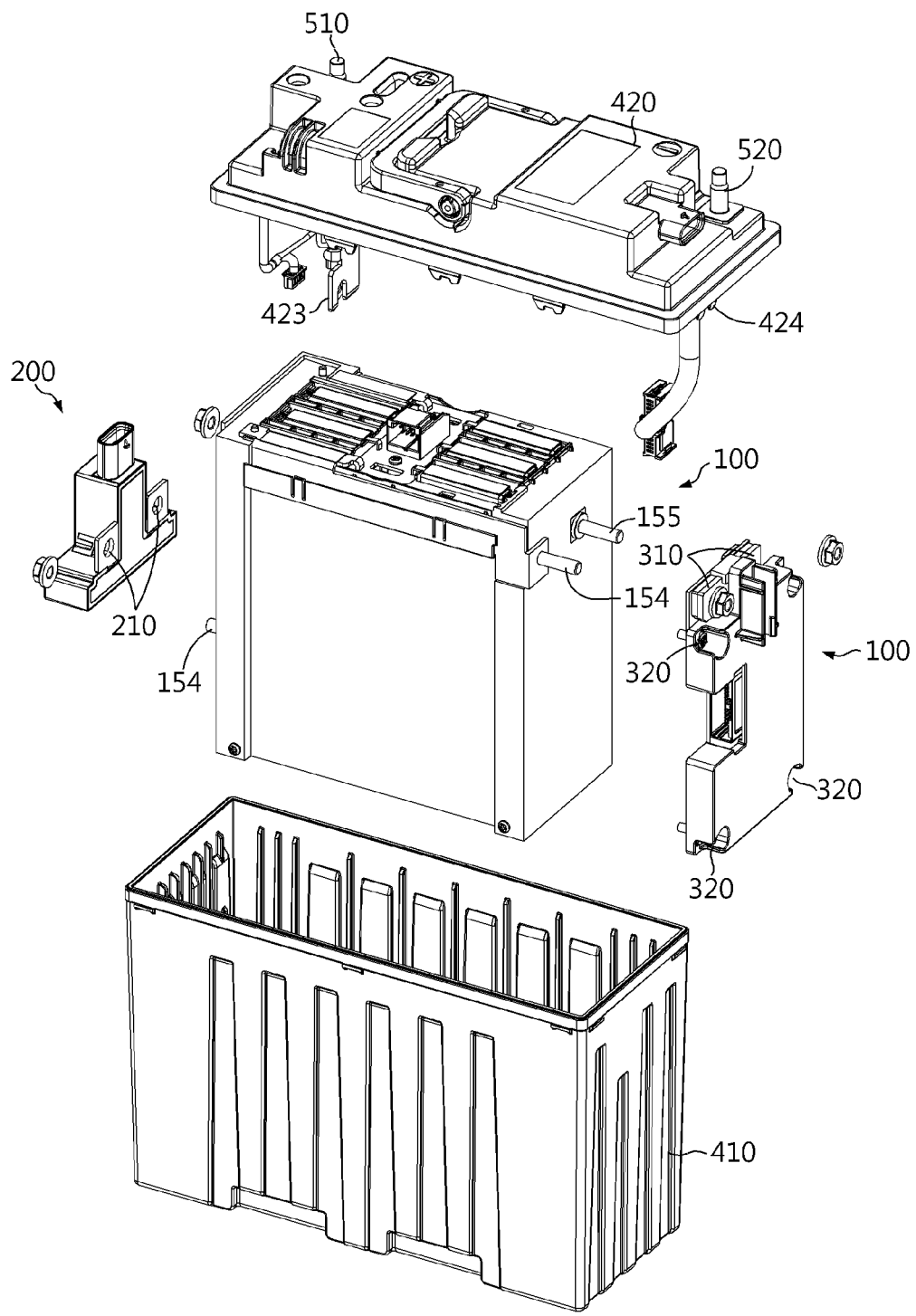
FIG. 9 is an exploded perspective view partially showing a battery pack according to an embodiment of the present disclosure.
Figure 10:
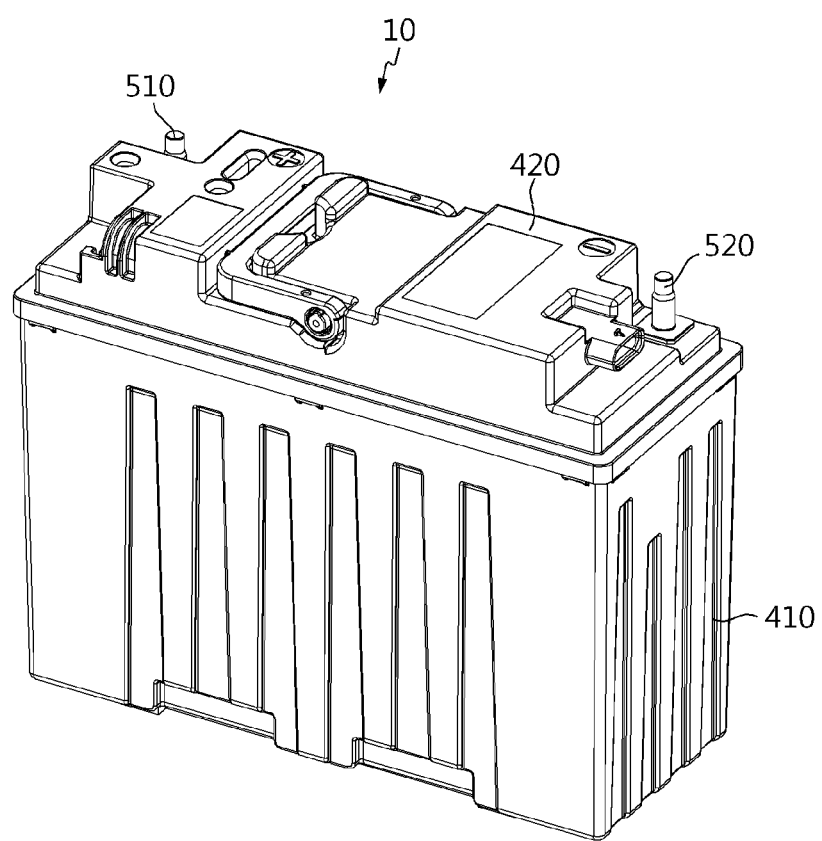
FIG. 10 is a perspective view showing the battery pack of FIG. 9 in an assembled state.

FIG. 9 is an exploded perspective view partially showing a battery pack according to an embodiment of the present disclosure, and FIG. 10 is a perspective view showing the battery pack of FIG. 9 in an assembled state.

Referring to FIG. 9, the relay assembly 200 may be attached to the first side plate and electrically connected to the positive electrode terminal connecting bus bar 153a as described above. For example, the relay assembly 200 may include two coupling flanges 210, so that the first terminal connecting member 154 is inserted into one coupling flange and then fixed with a nut, and the second terminal connecting member 155 and the positive electrode terminal connecting bus bar 423 are inserted into the other coupling flange and then fixed with a nut. The positive electrode terminal connecting bus bar 423 may be connected to the positive electrode terminal 510 of the battery pack cover 420.

In addition, the BMS assembly 300 may be attached to the second side plate 130 and electrically connected to the negative electrode terminal connecting bus bar 153b. For example, the BMS assembly 300 may include two coupling flanges 310, so that the first terminal connecting member 154 coupled to the other end of the negative electrode terminal connecting bus bar 153b is inserted into any one coupling flange and then fixed with a nut, and the second terminal connecting member 155 and the negative electrode terminal connecting bus bar 424 are inserted into the other coupling flange and then fixed with a nut. The negative electrode terminal connecting bus bar 424 may be connected to the negative electrode terminal 520 of the battery pack cover 420. Additionally, the BMS assembly 300 may further include a screw fixing portion 320 provided at a corner portion thereof and coupled to the second side plate by screwing.

Since the relay assembly 200 and the BMS assembly 300 may be electrically and mechanically coupled to the integrated cartridge 100, the assembling and coupling process may be simplified. In addition, according to this embodiment, the relay assembly 200 and the BMS assembly 300 may be assembled to be closely adhered to the first and second side plates 120, 130 only with the coupling flanges 210, 310 without a separate housing, thereby enhancing the space efficiency. Thus, the battery pack 10 may be configured more compactly in comparison to the existing technique.

Meanwhile, as shown in FIGS. 9 and 10, the battery pack 10 according to the present disclosure may include an integrated cartridge 100 as described above, a plurality of battery cells accommodated in the integrated cartridge 100, a relay assembly 200 attached to an outer surface of the first side plate 120 of the integrated cartridge 100, a BMS assembly 300 attached to an outer surface of the second side plate 130 of the integrated cartridge 100, and a battery pack housing 410 and a battery pack cover 420 for accommodating the above components therein.

The relay assembly 200 may be a switching element for selectively opening and closing a charging/discharging path through which a current flows. When an abnormal situation occurs at the battery pack 10, the relay assembly 200 may shut off the flow of the charging/discharging current.

The BMS assembly 300 means a battery management system that controls the overall charging/discharging operations of the battery cells, and may be regarded as a component that is commonly included in a battery pack. The BMS assembly 300 may be connected to the sensing unit 150 to control the battery cells based on voltage information or the like of the battery cells.

In a state where the relay assembly 200, the BMS assembly 300, the integrated cartridge 100 and the battery pack cover 420 are assembled and coupled, the battery pack housing 410 is provided to cover the assembled components, and then a portion where the battery pack cover 420 and the battery pack housing 410 are abutting may be welded to completely manufacture the battery pack.

Figure 11:
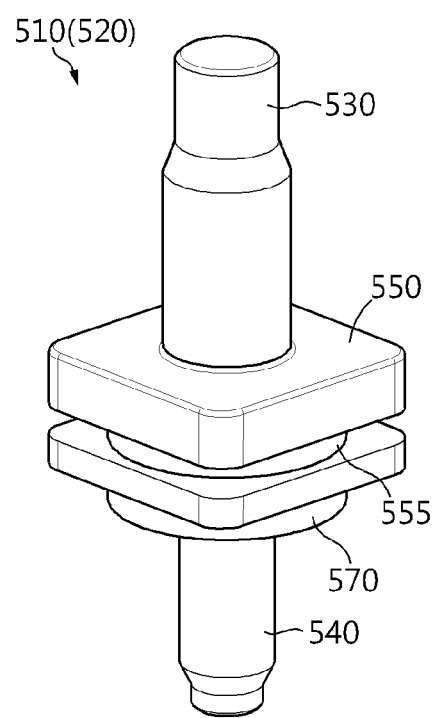
FIG. 11 is a perspective view showing a terminal of the battery pack of FIG. 9.
Figure 12:
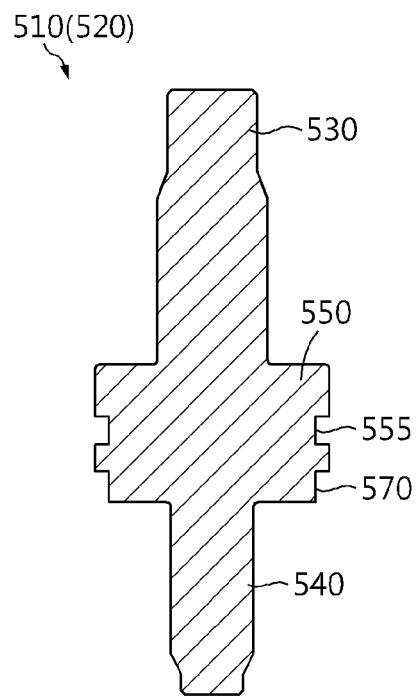
FIG. 12 is a cross-sectioned view showing the terminal of FIG. 11.
Figure 13:
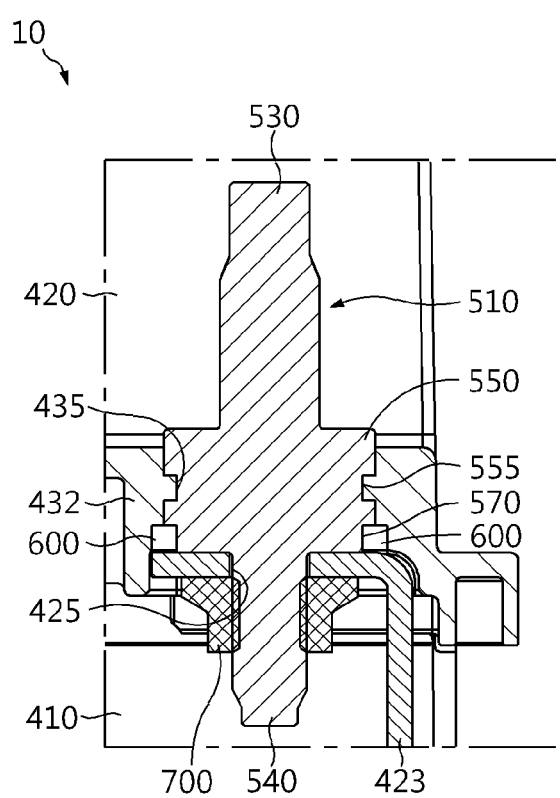
FIG. 13 is a cross-sectioned view showing an essential portion of the battery pack of FIG. 9.

FIG. 11 is a perspective view showing a terminal of the battery pack of FIG. 9, FIG. 12 is a cross-sectioned view showing the terminal of FIG. 11, and FIG. 13 is a cross-sectioned view showing an essential portion of the battery pack of FIG. 9.

Referring to FIGS. 11 to 13, the positive electrode terminal 510 and the negative electrode terminal 520 of the battery pack 10, namely a pair of terminals 510, 520 of the battery pack 10, may be fixed to the battery pack cover 420 by means of insert injection and bonding.

By the insert injection, the positive and negative electrode terminals 510, 520 and the battery pack cover 420 may be sealed without any gap. Thus, without any separate sealing member for waterproofing, it is possible to effectively prevent moisture and foreign matter from penetrating into the battery pack housing 410 at the inside of the battery pack cover 420.

In addition, by means of the bonding, the positive and negative electrode terminals 510, 520 may be more firmly fixed and mounted to the battery pack cover 420, and also the sealing effect for preventing penetration of moisture and foreign matter may be further improved.

Hereinafter, the positive and negative electrode terminals 510, 520 will be described in more detail.

The positive and negative electrode terminals 510, 520 may include an external power source connecting portion 530, a bus bar mounting portion 540, a cover mounting portion 550 and a bonding portion 570, respectively.

The external power source connecting portion 530 may be connected to the external power source or the like at the outside of the battery pack cover 420. The external power source connecting portion 530 may be protruded to a predetermined length above the battery pack cover 420 when the battery pack cover 420 is mounted to the positive and negative electrode terminals 510, 520.

The bus bar mounting portion 540 may be mounted to the terminal connecting bus bars 423, 424, respectively, for electrical connection with the battery cells. Here, the bus bar mounting portion 540 may be inserted into each terminal hole 425 of the terminal connecting bus bars 423, 424.

The cover mounting portion 550 may connect the bus bar mounting portion 540 to the external power source connecting portion 530 and be fixedly mounted in an insert portion 432 of the battery pack cover 420 by means of the insert injection. Here, the insert portion 432 may include an insert protrusion 435. The insert protrusion 435 is provided at an inner circumference of the insert portion 432 and may be formed to protrude from the inner circumference of the insert portion 432.

The cover mounting portion 550 may have an insert groove 555.

The insert groove 555 may be formed at an outer circumference of the cover mounting portion 550. The insert protrusion 435 of the battery pack cover 420 may be inserted into this insert groove 555.

The insert groove 555 in which the insert protrusion 435 is inserted may primarily block moisture or foreign matter at the outside of the battery pack cover 420. In other words, even though moisture, foreign matter or the like is introduced at the upper portion of the cover mounting portion 550 above the insert portion 432, it is caught between the insert protrusion 435 and the insert groove 555, and thus it is possible to effectively prevent moisture, foreign matter or the like from further moving downwards toward the battery pack housing 410.

The bonding portion 570 is provided at an outer circumference of the cover mounting portion 550 and may be disposed between the insert groove 555 and each terminal connecting bus bar 423, 424. The bonding portion 570 may be bonded to the insert portion 432 of the battery pack cover 420 by means of an adhesive 600.

The adhesive 600 is required for the bonding and may be fully filled between the insert portion 432 of the battery pack cover 420 and the bonding portion 570 under the insert groove 555.

By means of the bonding by the adhesive 600, the cover mounting portion 550 may be more stably fixed to the insert portion 432 of the battery pack cover 420.

In addition, the adhesive 600 seals the space between the lower side of the insert portion 432 and the lower side of the cover mounting portion 550 more securely. Thus, even though moisture, foreign matter or the like passes between the insert protrusion 435 and the insert groove 555 and moves downwards, it is possible to secondarily prevent the moisture and foreign matter from penetrating into the battery pack housing 410.

A support nut 700 is coupled to the bus bar mounting portion 540 and may support the positive and negative electrode terminals 510, 520 and the positive and negative electrode terminal connecting bus bars 423, 424.

The support nut 700 may be provided in a pair to support the positive and negative electrode terminal connecting bus bars 423, 424 and the positive and negative electrode terminals 510, 520, respectively. By using the pair of support nuts 700, the positive and negative electrode terminals 510, 520 may be more stably coupled to the positive electrode and negative electrode terminal connecting bus bars 423, 424.

As described above, in the battery pack 10 of this embodiment, the positive and negative electrode terminals 510, 520 may be mounted to the battery pack cover 420 more airtightly without any gap by means of the insert injection and the bonding.

Thus, the battery pack 10 of this embodiment may be implemented with a more airtight structure without an additional separate sealing member.

The battery pack 10 according to the present disclosure may be applied to a vehicle such as an electric vehicle and a hybrid electric vehicle. In other words, the vehicle according to the present disclosure may include the battery pack 10 according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

As used herein, terms indicating directions such as "up", "down", "left", "right", and the like are only for convenience of description, and it will be obvious to those skilled in the art that these terms may be expressed differently depending upon viewing positions of an observer, positions of an object, or the like.

What is claimed is:

1. An integrated cartridge, comprising:
a main frame composed of
a front plate having a plurality of lead passing holes provided in a slit form so that electrode leads of a plurality of battery cells arranged in a layered form pass therethrough, and
first and second side plates extending at both edges of the front plate in parallel to each other and having a plurality of cell insert slots provided at inner sides thereof, which face each other, so that the plurality of battery cells are capable of being inserted from a free end to the front plate;
a cover plate coupled to the first and second side plates to cover the plurality of battery cells arranged in a layered form between the first and second side plates; and
a sensing unit mounted to the front plate and electrically connected to the electrode leads to sense electric characteristics of the plurality of battery cells,
wherein the cover plate includes a rear plate in parallel to the front plate, and an upper and a lower plate in parallel to each other and extending respectively from opposite edges of the rear plate;
wherein the upper and lower plates of the cover plate are configured to be pushed into the main frame to form a box that encloses the plurality of battery cells;
wherein the upper and lower plates, the rear plate, the front plate, and the first and second side plates form respective six sides of the box that encloses the plurality of battery cells; and
wherein the first and second side plates partially wrap around and overlap the upper and lower plates.

2. The integrated cartridge according to claim 1, wherein the first side plate, the second side plate and the front plate are formed integrally.

3. The integrated cartridge according to claim 1, wherein the sensing unit includes:
a plurality of lead connecting bus bars configured to contact the electrode leads drawn to the outside through the plurality of lead passing holes, respectively;
a printed circuit board (PCB) electrically connected to one ends of the plurality of lead connecting bus bars; and a terminal connecting bus bar extending from the PCB to the outside.

4. The integrated cartridge according to claim 3, wherein the plurality of lead connecting bus bars are coupled to the front plate by snap-fitting or hooking.

5. The integrated cartridge according to claim 3, wherein the front plate further includes a board placing unit shaped to conform to the PCB.

6. The integrated cartridge according to claim 3,
wherein the terminal connecting bus bar includes a positive electrode terminal connecting bus bar and a negative electrode terminal connecting bus bar,
wherein the positive electrode terminal connecting bus bar has one end connected to the PCB and the other end disposed to be closely adhered to an outer surface of the first side plate, and
wherein the negative electrode terminal connecting bus bar has one end connected to the PCB and the other end disposed to be closely adhered to an outer surface of the second side plate.

7. The integrated cartridge according to claim 1,
wherein the first and second side plates further include fitting portions respectively provided at the top end and the bottom end so that both sides of the upper plate and the lower plate are fit therein.

8. The integrated cartridge according to claim 7,
wherein the fitting portion has a hole formed therein in a vertical direction, and the upper and lower plates have bolt coupling holes communicating with the hole in a state where the first and second side plates are fit into the fitting portion, and
wherein a coupling member is inserted into the hole and the bolt coupling hole so that the cover plate is restrained by the main frame.

9. A battery pack, comprising:
an integrated cartridge defined in claim 1;
a plurality of battery cells accommodated in the cartridge;
a relay assembly attached to an outer surface of the first side plate of the integrated cartridge; and
a battery management system (BMS) assembly attached to an outer surface of the second side plate of the integrated cartridge.

10. The battery pack according to claim 9, further comprising:
a battery pack housing and a battery pack cover coupled to each other to accommodate the plurality of battery cells, the relay assembly and the BMS assembly; and
at least one terminal electrically connected to the plurality of battery cells and provided to pass through the battery pack cover to the outside and be connected to an external power source, the at least one terminal being insert-injected to the battery pack cover.

11. The battery pack according to claim 10,
wherein the at least one terminal is additionally coupled to the battery pack cover by bonding.

12. A vehicle, comprising a battery pack defined in claim 9.

* * * * *